Figure 1:
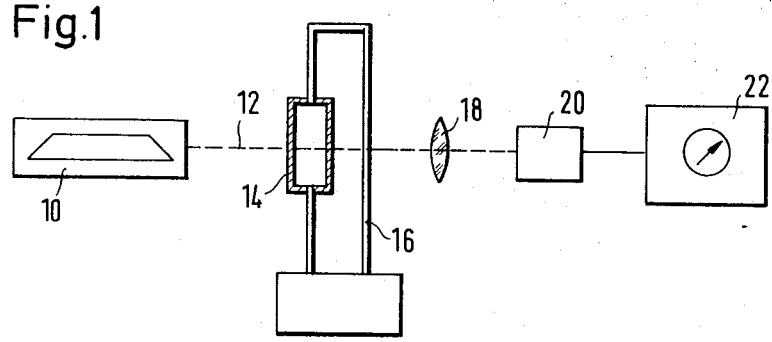

United States Patent [19]
Kaiser

[11] 3,825,347
[45] July 23, 1974

[54] APPARATUS FOR DETERMINING A SUBSTANCE BY AN OPTICAL RADIATION

[75] Inventor: Nils Kaiser, Gauting, Germany

[73] Assignee: Max-Planck-Gesellschaft zur Forderung der Wissenschaften e.v., Gottingen, Germany

[22] Filed: Aug. 9, 1971

[21] Appl. No.: 170,207

[30] Foreign Application Priority Data
Aug. 7, 1970  Germany............................ 2039382
Sept. 14, 1970  Germany............................ 2045386
Nov. 25, 1970  Germany............................ 2058064

[52] U.S. Cl................................. 356/107, 356/113
[51] Int. Cl. ........................................... G01b 9/02
[58] Field of Search ............ 356/106, 107, 113, 108

[56] References Cited
UNITED STATES PATENTS
2,604,004  7/1952  Root................................... 356/106
2,668,471  2/1954  Benzinger et al................... 356/107
2,849,912  9/1958  Blesse et al........................ 356/106
3,494,698  2/1970  Neumann........................... 356/106

FOREIGN PATENTS OR APPLICATIONS
197,219  10/1967  U.S.S.R............................... 356/106

OTHER PUBLICATIONS
"Infrared Interferometry . . . Detection," 9 Applied Optics 1319.

Primary Examiner—John K. Corbin
Assistant Examiner—Conrad Clark
Attorney, Agent, or Firm—William R. Woodward, Flynn & Frishauf

[57] ABSTRACT

A laser produces a beam of optical radiation. The substance to be determined may be $CO_2$, and in this case the laser is a $CO_2$-laser. Alternatively, the laser may be a tunable laser, and the beam is split by a beam splitter into sample and reference beams, the sample beam being relatively modified by said substance. The modified beam and the reference beam are united and the united beam is sensed by a detector. The optical lengths of the paths transversed by the reference and sample beams are exactly the same save the influence of said substance. A preferred sensing system indicates both the phase shift and attenuation of the sample beam by the substance to be determined.

15 Claims, 6 Drawing Figures

APPARATUS FOR DETERMINING A SUBSTANCE BY AN OPTICAL RADIATION

The present invention relates to an apparatus for the determination of a given substance contained in a material which exhibits a relatively strong absorption of radiation, as a water base solution or especially a biological material by measurement of the influence upon optical radiation, comprising a radiation source for the production of a beam of radiation, a device for positioning the material to be examined in the path of at least a portion of the radiation beam, and a radiation receiver giving an output signal which is a function of the radiation influenced by the substance.

The term "optical radiation" as used in the specification and claims is intended to include infrared visible and ultraviolet radiation.

A preferred field of application of the invention is the determination of the $CO_2$ content of a biological substance, however, the invention is not limited to the determination of $CO_2$ content, but may also be used for the determination of other components of biological and other substances which show selective absorption in the available wavelength range.

As the chief application field of the invention is the determination of $CO_2$, the invention will be mainly described by use of this example.

The need of determining the $CO_2$ content of a biological substance occurs relatively frequently in practice, because $CO_2$ is a characteristic product of metabolism. The determination of the $CO_2$ content of gases by means of infrared absorption is of course well known in the art. However, known infrared-absorption measuring instruments, which in general use a thermal radiator as a source of radiation, are practically only suitable for the determination of the content of free $CO_2$ in gaseous media. For many other purposes, for example, for the investigation of metabolic processes, of the course of biological processes, of bacterial cultures, or of the blood, especially in vivo, e.g. during operations, determination of $CO_2$ occurring in more or less firmly bound form has to be made.

SUBJECT MATTER OF THE INVENTION

Surprisingly, it has been found possible to detect $CO_2$ in more or less strongly bound form, e.g. in blood (or reversely, the amount of oxy-haemoglobin), by using a laser as a radiation source; the $CO_2$ can even be quantitatively determined in the presence of $H_2O$, e.g. in aqueous solutions, although $H_2O$ shows a very broad and strong absorption band in the region of the $CO_2$ absorption (at approx. 10.6 microns).

According to the first embodiment of the invention, a $CO_2$ laser is used as radiation source in an apparatus of the kind described above. Using a $CO_2$ laser very accurate measurements of the content, e.g. the percentage, of $CO_2$ in a biological material may be carried out with relatively small instrumental outlay.

According to another embodiment of the invention, the radiation source consists of a laser which is rapidly tunable (i.e. frequency variable) within a wide frequency band, the frequency band covering a range within which the substance to be determined shows strong selective absorption.

Special embodiments and further features and advantages of the invention are described more closely as follows with the aid of the drawings in which each of FIGS. 1 to 6 is a schematic representation of an embodiment of an apparatus according to the invention.

The first embodiment of the invention shown by FIG. 1 makes use of transmission. It comprises a $CO_2$ laser 10, only shown schematically, which is used to advantage in continuous operation and gives a beam of radiation 12 of a wavelength of approximately 10.6 microns. A sample cuvette, transparent to the 10.6 micron radiation and containing the biological material to be examined, is situated in the path of the beam of radiation. The sample cuvette may contain a layer of the biological material of 10 microns thickness, by way of example. If the biological material consists of a liquid, e.g. blood, the sample cuvette 14 may form part of a line 16 carrying the biological material to be examined. In the case of blood, the line 16 may represent the course of extra-corporeal circulation.

After passing through the sample cuvette 14, the parallel beam of laser radiation 12 is focussed by means of suitable infrared-transmissive optics 18 onto a radiation detector, which may consist, by way of example, of a bolometer, or a PbS cell etc. The radiation detector 20 may be connected to an indicating and/or recording device 22, for example, a measuring instrument such as an oscilloscope and/or a recorder.

Figure 2:
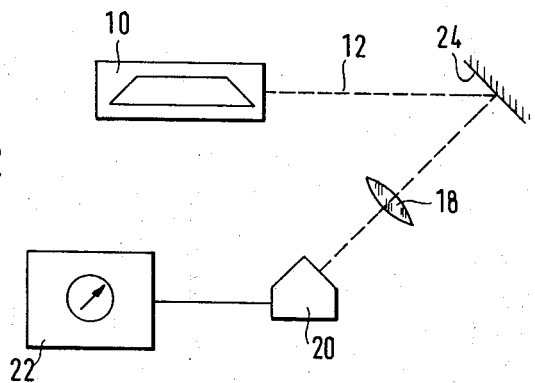

The embodiment of the invention shown by FIG. 2 makes use of reflection. The beam of radiation produced by the $CO_2$ laser 10 falls onto the biological material being examined 24, for example onto the skin of a patient, from which it is reflected through the optical arrangement 19 onto the radiation detector 20. This instrument, being suitable for bloodless measurements, may be applied to the ear lobe in order to determine the oxy-haemoglobin content of the blood, by way of example.

When reflection measurements are carried out with the instrument shown by FIG. 2, the biological material being examined may, of course, be contained inside the sample cuvette, as is the case with the instrument shown by FIG. 1.

Figure 3:
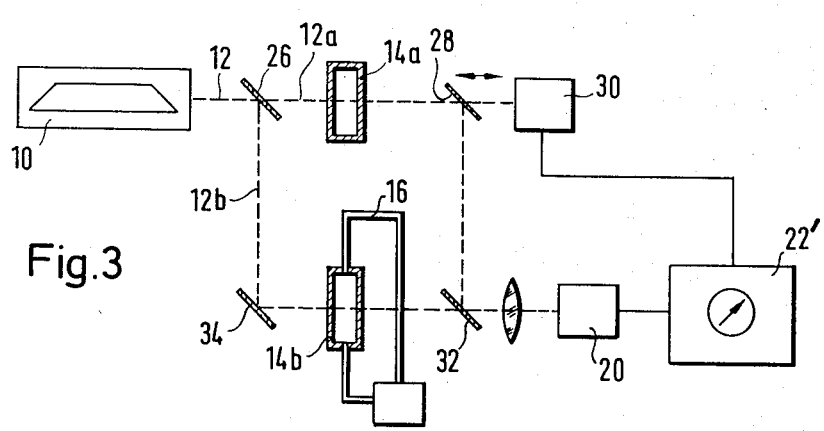

The embodiment of the invention shown by FIG. 3 is used to carry out comparative measurements. The beam of radiation from the $CO_2$ laser 10 is split into a reference beam 12a and a sample beam 12b by means of a semi-transparent mirror 26. The reference beam 12a passes through a comparison cuvette 14a and falls onto a mirror 28, which can be displaced along the direction of the axis of the incident beam of radiation by means of an adjusting-device 30 containing a piezoelectric crystal. The reflected reference beam falls onto a semi-transparent mirror 32, from which it is partially reflected onto the radiation detector 20.

The sample beam 12b is deflected by a mirror 34, passes through a sample cuvette 14b containing the biological material to be examined, then through the semi-transparent mirror 32 and falls onto the radiation detector 20, together with the reflected reference beam. The displacement of the mirror 28, illustrated by a double arrow, is controlled by a balancing voltage produced by the output signal of the radiation detector 20. The control circuit containing the adjusting device 30 and the radiation detector 20 is so designed, that the output signal of the radiation detector, being dependent upon the phase relationship between the sample beam and the reference beam, is either maximised or reduced to zero by the balancing voltage; null methods of this kind are known in principle. The result of the measurement is represented by the recording or indication of the balancing voltage by the device 22'.

Figure 4:
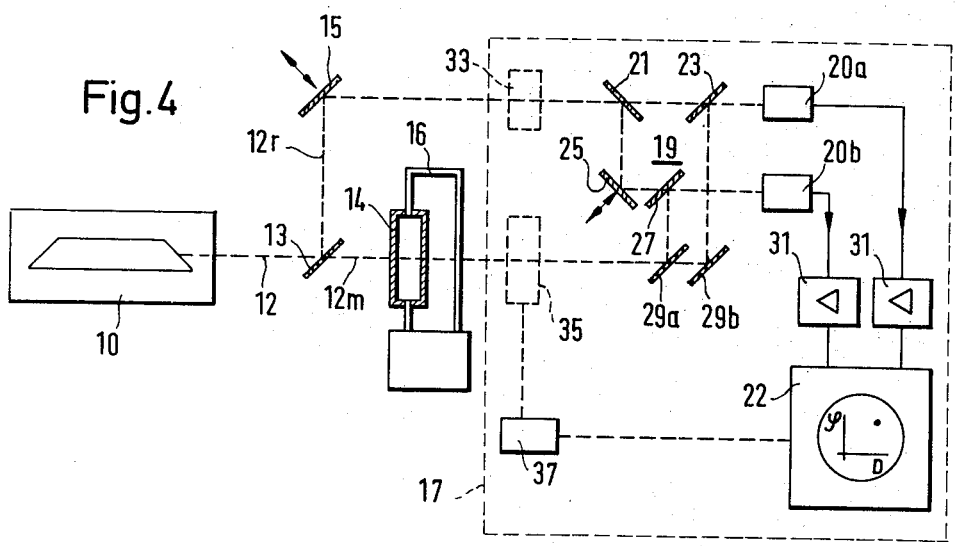

The embodiment illustrated by FIG. 4 represents a further development of the embodiment shown by FIG. 3. Identical parts have therefore been labelled using the same reference numbers.

In the case of the embodiment shown by FIG. 4, a semi-transparent mirror 13 has been placed in the optical path of the radiation beam 12, splitting the radiation beam 12 into a sample beam 12m and a reference beam 12r. The reference beam 12r is reflected by a mirror 15 into a direction parallel to the sample beam 12m. The position of the mirror 15 can be set in known manner by means of a piezo-electric element, as illustrated by a double arrow, in order to bring about a desired phase relationship between the sample beam and the reference beam. The sample beam, as influenced by the sample, and the reference beam are processed in a detecting device designated in its entirety by 17. The detecting device contains an interferometric or mixing device 19, in which output signals corresponding to the attenuation of the sample beam by the sample and to the phase shift of the sample beam due to the sample are produced. For this purpose the reflected reference beam is split into transmitted and reflected beam portions by a semi-transparent mirror 21. The transmitted portion of the beam passes through another semi-transparent mirror 23 and falls onto a radiation detector 20a, which may consist of one of the devices mentioned above. The reflected portion of the reference beam is again reflected from a mirror 25, which can be displaced by means of a piezo-electric element, it then passes through a semi-transparent mirror 27 and falls onto a second radiation detector 20b. The sample beam, influenced by the sample, is reflected by means of a semi-transparent mirror 29a and a mirror 29b onto the semi-transparent mirrors 27 and 23, each of which reflect a portion of the beam onto the radiation detectors 20b and 20a respectively.

The position of the mirror 25 is so chosen that the parts of the reference beam are phase shifted by 90° relative to each other when brought to interaction with versions of the sample beam, as influenced by the sample. With appropriate adjustment of the phase position which can be made, for example, with the aid of the movable mirror 15, the conditions may be so chosen that the output signals of the radiation detectors 20a and 20b correspond respectively to the attenuation and to the phase shift of the sample radiation, due to the sample. The output signals of the radiation detectors are amplified by amplifiers 31 and are displayed or recorded. This may be achieved, or example, by means of cathode ray oscilloscope 22; the signal corresponding to the attenuation being shown by the X-deflection and that corresponding to the phase shift by the Y-deflection, or else both signals may be represented separately by the two Y-deflections of a two-beam oscilloscope.

Optimum intensity relationships may be achieved by the provision of an attenuator 33, such as a neutral density wedge in the path of the reference beam.

According to a further modification of this embodiment, the amplitude of the sample beam may be modulated by means of an amplitude modulator 35. The amplitude modulator may consist of a rotating, slit chopper-disc, or a Kerr cell shutter controlled by an a.c. voltage (of high frequency if necessary), by way of example, or else its purpose can be served by the modulations of a piezo-electrically controlled mirror. It is of advantage for the device 37 controlling the modulator 35 to turn on the beam of the oscilloscope at the instant during which the signal corresponding to the attenutation is at a maximum. This may be achieved by suitable adjustment of the phase of the signal controlling the modulator relative to that of the signal by which the cathode ray beam of oscilloscope is intensity modulated.

Of course, reflectivity measurements may also be carried out on the biological material to be examined; in this case the sample may be positioned in place of the mirror 29b, by way of example.

Figure 5:
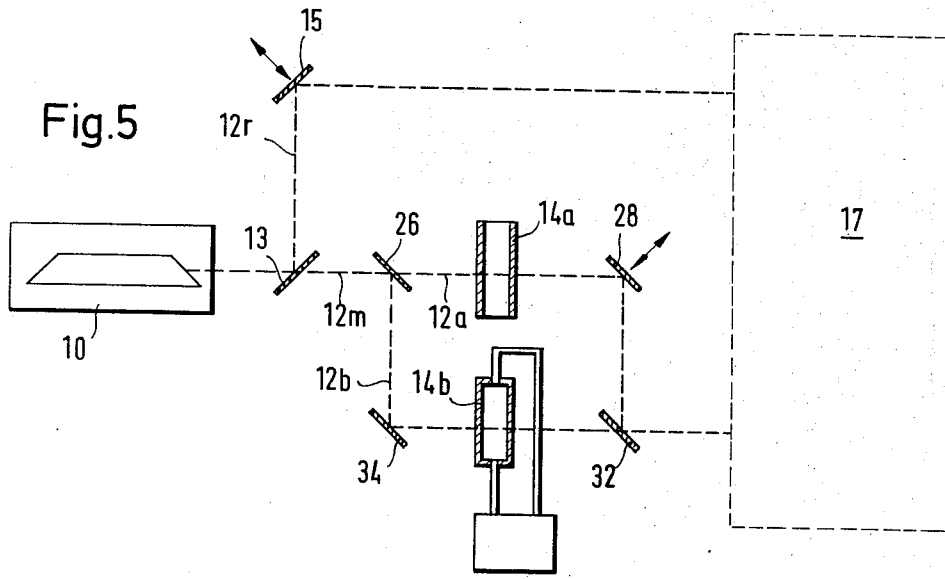

The embodiment of the invention illustrated by FIG. 5 is also a modification of the embodiment shown by FIG. 3. The sample beam 12m, however, is split into a further reference beam 12a and the actual sample beam 12b by a semi-transparent mirror 26. The reference beam 12a passes through a comparison cuvette 14a and falls onto a mirror 28, which again can be displaced by means of an adjusting device containing a piezo-electric crystal with suitable energizing means. The reflected reference beam then falls onto a semi-transparent mirror 32, from which it is partially reflected into the radiation detecting device 17, which may be designed in the same way as described in connection with FIG. 4.

The sample beam 12b is redirected by a mirror 34 so that it passes through a sample cuvette 14b, which corresponds to the sample cuvette 14 in FIG. 1 and contains the biological or other material to be examined, as well as through the semi-transparent mirror 32 and falls onto the radiation detector 17 together with the reflected part of the reference beam 12a. As in the case of the embodiment shown by FIG. 3, the portion of the sample beam 12b which is transmitted by the mirror 32 and the portion of the reference beam 12a which is reflected by this mirror falls onto a radiation detector, the output signal of which so controls the adjusting device for the mirror 28 that the output signal of the radiation detector is either practically zero or a maximum. The result of the measurement is represented by the recording or indication of the controlling voltage.

The described principles of measurement may, of course, also be applied to other optical measuring methods and in the case of other substance to be detected, a laser can be used containing as active or "lasing" medium the substance or the component of the substance to be detected.

A mixing device, giving a signal the frequency of which corresponds to the frequency difference between sample and reference beam, that is the modulation frequency in particular, may take the place of the reference- and detecting devices, e.g. the devices 23, 20a or 27, 20b, especially when the sample beam is modulated by the modulator 35 with a frequency lying in the high or medium frequency region. In this case it is of advantage for the amplifiers 31 to be a.c. voltage amplifiers which can be tuned to the modulation frequency.

It is preferable for the attenuator to consist of a circular or optical circular polariser (transparent substance exhibiting a Faraday effect when acted upon by a device producing a variable, axial magnetic field) which controls the attenuation either in combination with parallel polarisers situated in front or behind it, or by itself because the radiation is usually naturally polarised and the various mirrors act as polarising elements. This kind of attenuator has the advantage of not producing phase shifts.

Figure 6:
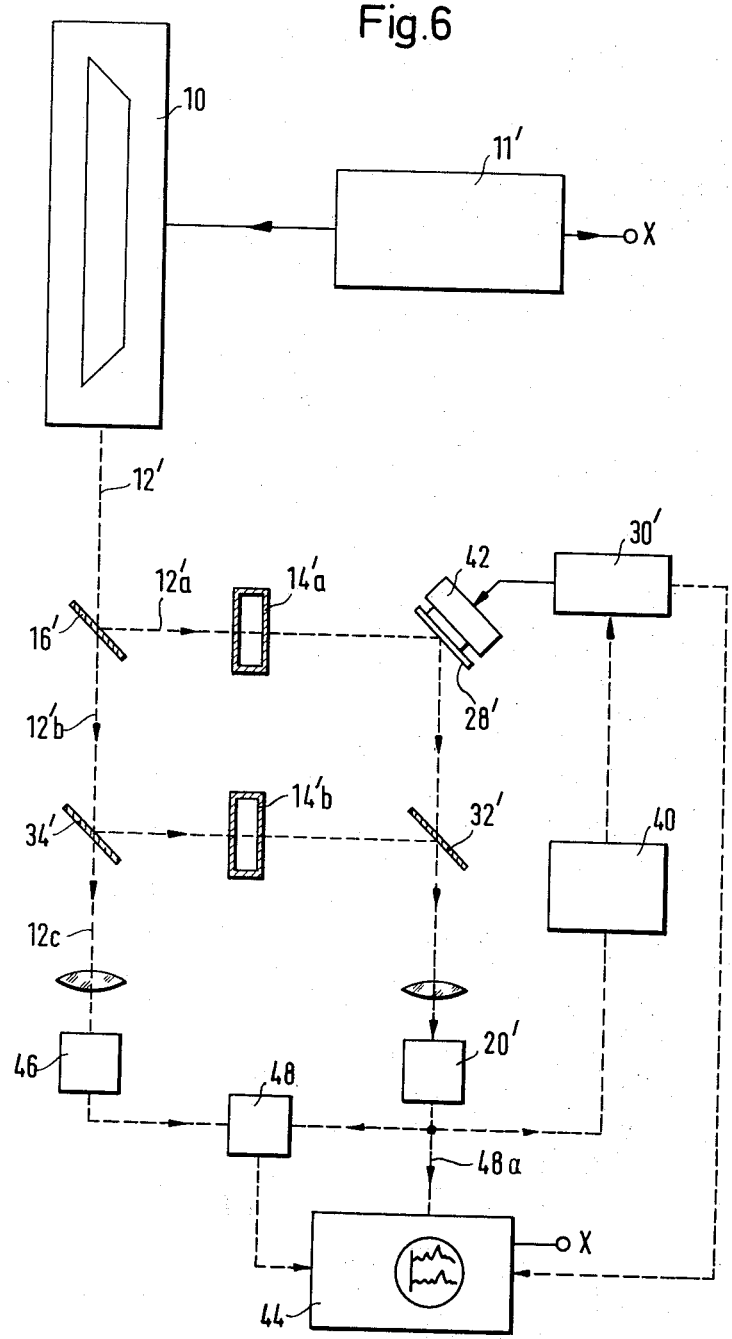

FIG. 6 shows a further embodiment of the invention, in which the accuracy as well as the information content of the measurements are considerably increased, as compared with the previously described embodiments, by the use of a laser which is rapidly tunable within a relatively wide frequency band as a source of radiation. In other words, the wavelength of the beam of radiation produced by the laser can be rapidly changed within a relatively broad range of wavelengths. The embodiment shown by FIG. 6 is further characterized by equality of the optical paths of the sample and comparison channels between the input side of the beam splitter and the output side of the device uniting the beams. In other words, the optical path of the sample and reference beams comprise exactly the same number of wavelength of the radiation at a given frequency with or without the influence of said substance.

The band width of the apparatus is made broad, so that the measurements are not affected even when the oscillation frequency of the laser varies within a wide range. The result of the measurement is then independent of the frequency or wavelength of the beam of radiation given by the laser, apart from effects produced by the material being examined.

As stated, the laser 10 shown only schematically by FIG. 6 is tunable. Such tunable lasers are known. The oscillation frequency of the laser is controllable by means of a modulator 11, which may produce a linear change of frequency with time, for example. If the display of the output signal is made by a recording instrument, e.g. a pen-recorder, the frequency change takes place so slowly as to allow accurate recording of the result of the measurement. If the results of measurement are displayed by an oscilloscope, as shall be assumed to be the case in the following, it is preferable for the frequency change to occur relatively rapidly and periodically, e.g. to follow a saw-tooth oscillation of 50 Hz.

The laser 10' produces a beam of radiation 12', which is divided by a beam-splitter 16' into a reference beam 12'a and a sample beam 12'b. The reference beam 12'a passes through a comparison cuvette 14'a and falls onto a redirecting mirror 28', the position of which can be adjusted preferably by electrical means, as will be described in more detail. The sample beam 12b falls onto a deflecting mirror 34', then passes through a sample cuvette 14'b and reaches a semi-transparent mirror 32', from which a considerable portion of the incident radiation is reflected onto a radiation detector 20'. A considerable portion of the reference from the mirror 28' passes through the semi-transparent mirror 32'; the beams which become united in this way give rise to interference at the position of the radiation detector 20'.

With this embodiment of the invention, the optical paths of the comparison channel traversed by the reference beam 12'a and of the sample channel traversed by the sample beam 12'b, as measured from the entry side of the beam splitter 16' to the exit side of the semi-transparent mirror 32', are equal, so that the interference at the location of the radiation detector 20' remains unchanged if the wavelength of the radiation beam 12' is changed, other conditions, however, remaining constant and independent of frequency.

The output signal of the radiation detector 20' therefore shows the attenuation and the phase shift due to the material contained in the cuvette 14'b, varying with the wavelength.

In order to display the attenuation and phase shift, it is of advantage to lead the output signal of the radiation detector 20' via a control amplifier 40 to a device 30', which gives an adjusting signal or an adjusting device 42, enabling displacement of the position of the mirror 28' to be made.

The adjusting device preferably contains a piezoelectric element, to which the mirror 28' is attached. The controlling arrangement comprising elements 20', 40, 30' and 28' is preferably designed so that an intensity maximum due to constructive interference is maintained at the position of the radiation detector 20'. The radiation intensity at the intensity maximum then varies inversely with the attenuation of the radiation due to the material in cuvette 14'b, whilst the displacement of the mirror 28', and with it the adjusting signal, represents a measure of the phase shift of the radiation due to the substance. The attenuation and phase shift may be presented on a two-beam oscillograph, the time-base of which can be controlled by the modulator 11' by connecting an output terminal X of the modulator 11' carring the modulating signal to a corresponding X-deflection or synchronisation terminal of the oscilloscope 44.

In order to render the signal corresponding to the attenuation independent of possibly existent fluctuations of intensity of the radiation beam 12, use may be made of a comparison measurement. For this purpose the deflecting mirror 34' can be designed as a semi-transparent mirror and the intensity of the transmitted portion 12c of the radiation beam 12'b measured by means of another radiation detector. The output signal of the radiation sensitive device 46 is compared with the output signal of the radiation detector 20', which measures the intensity maximum of the interference as described, using a comparison circuit supplying a ratio signal, independent of the amplitude fluctuations of the incoming radiation, to the oscilloscope 44. In this case the direct connection 48a between the radiation detector 20' and the oscilloscope 44 becomes superfluous.

If the changes of the oscillation frequency of the radiation produced by the laser 10' are slow enough, an XY-pen recorder or similar instrument may, of course, be used in place of the oscilloscope 44.

When the present instrument is taken into operation, the mirrors 16', 28', 32' and 34' are first adjusted so that the optical paths of the sample channel and the reference channel are equal. This can be done, for example, after an initial rough mechanical adjustment, by moving the mirror 28', for which purpose a suitable bias voltage is applied to the adjusting device 42. Alternatively or additionally, the mirror 34' may also be fitted with an adjustment device, for example, a piezoelectric crystal and a suitable excitation circuit. Following this, the control circuit is adjusted so that an intensity maximum due to constructive interference occurs at the position of the radiation-sensitive device 20', which means, that the optical path difference between the reference beam and the sample beam is zero. This path difference remains zero when the laser frequency changes, even when the control circuit is broken. The required measurements are then carried out with the control circuit in operation and the laser modulated.

I claim:

1. Apparatus for determining the amount of a given component within a composition of matter to be investigated, said apparatus comprising:
   a laser radiation source (10) producing a beam (12) of electromagnetic radiation;
   a beam splitter (13) positioned in the path of said beam to derive therefrom a sample beam (12m) of said radiation and a reference beam (12r) of said radiation;
   sample positioning means (14) to position a sample of said substance in the path of said sample beam to modify the amplitude and phase of the radiation of said sample beam (12m) as a function of said component;
   first means (21) to produce first and second versions of said reference beam, said versions having first and second phases respectively;
   second means (29a, 29b) for producing first and second versions of said modified sample beam, said versions having third and fourth phases, respectively;
   third means (23) for combining said first reference beam version and said first modified sample beam version to produce a first combined beam;
   fourth means (27) for combining said second reference beam version with said second modified sample beam version to produce a second combined beam;
   first phase adjustment means (25) located in the path of at least one of the versions of the reference beam to control the phasing of said beams to provide a phase difference between said first and third phases which differs by 90° from the difference between said second and fourth phases;
   second phase adjustment means (15) for adjusting the phase of both versions of said reference beam relative to both versions of said modified sample beam; and
   a first and second radiation detecting means (20a, 20b) receiving said first and second combined beams, respectively, to produce first and second output signals indicating the attenuation and phase shift, respectively, of the sample beam radiation caused by said substance.

2. The apparatus according to claim 1, comprising an amplitude modulator (11') modulating the sample beam with a frequency (X) which is far lower than the frequency of the laser radiation, being placed in the path of the sample beam, and by a.c. voltage amplifiers being connected to the radiation detectors.

3. The apparatus according to claim 2, wherein the radiation detection means comprises an oscilloscope, the X- and Y-deflections of the oscilloscope being controlled by the first and second output signals, and the beam of the oscilloscope being briefly intensity modulated by the modulation frequency.

4. The apparatus according to claim 1 comprising a further beamsplitter (26) splitting the sample beam produced from the first-mentioned beam portion to form a second reference beam (12a);
   a comparison cuvette (14a) situated in the path of the second reference beam;
   the sample means (14b) being located in the path of the sample beam proper
   and a combining device (32) located in the paths of the beams to unite by superposition the beams issuing from the comparison and the sample cuvettes to pass the combined beam to said second means.

5. The apparatus according to claim 1, comprising adjustable means (15, 25, 28) to change the optical length of the path traversed by one beam with respect to the optical length of the path traversed by the second beam and being situated in the radiation path of at least one of the two beams.

6. Instrument according to claim 1, including an attenuator comprising an optical circular polariser being situated in the radiation path of the reference beam.

7. Apparatus according to claim 1 wherein the first means comprises a first semi-transparent mirror (21) which splits the reference beam (12r) into a transmitted portion and a reflected portion, said portions forming said versions of first and second phase;
   the third means comprises a second transparent mirror (23), the transmitted portion of the reference beam passing through said second transparent mirror (23) and falling on said first radiation detector (20a);
   the phase adjustment means comprises a mirror (25) which acts as a phase shifter and is movably mounted;
   the fourth means comprises a third semi-transparent mirror (27), the reflected portion of the reference beam being directed through said third semi-transparent mirror (27) on said second radiation detector (20b) by said phase adjustment mirror (25);
   said second means comprises a second mirror (29b) producing the first version of said modified sample beam and a third semi-transparent mirror (29a) producing said second version of said modified sample beam;
   said fourth means (27) comprises a fourth semi-transparent mirror (27);
   the modified sample beam being directed through said third semi-transparent mirror (29a), to be partially reflected thereby to said fourth semi-transparent mirror (27) and to be combined thereby with said second reference beam version, and to the extent that said modified sample beam, influenced by the sample, passes through said third semi-transparent mirror (29a), being reflected by said second mirror (29b) to be directed to said second semi-transparent mirror and to be combined with said first version of said reference beam;
   the length of the optical paths being of such dimensions that both portions of the sample beams reflected by said third semi-transparent mirror (29a) and by said second mirror (29b) interact with said first and said second versions of the reference beam in said third and fourth means, respectively, in phase differences which differ by 90° relative to each other.

8. Apparatus according to claim 1, wherein the sample of said substance positioned in said sample position means includes biological material having a $CO_2$ content, wherein said laser is a $CO_2$ laser.

9. Apparatus according to claim 8, wherein the laser and the radiation detection means are so positioned with respect to the biological material, that the radiation directed onto the biological material by the laser is reflected towards the radiation detection means.

10. Apparatus according to claim 1, wherein the laser is tunable to produce electromagnetic radiation of variable wavelength within a predetermined range; and the optical paths covered by said reference beam and by said sample beam from the beam splitter to said third and fourth means have exactly the same number of wavelengths of radiation from the laser.

11. Apparatus for determining the amount of a given component of a substance comprising:
a laser radiation source producing a beam of electromagnetic radiation;
a beam splitter positioned in the path of said beam to derive therefrom a sample beam of said radiation and a reference beam of said radiation;
sample positioning means to position a sample of said substance in the path of said sample to produce a secondary sample beam modified by said substance;
beam combining means to combine said reference beam and said modified sample beam and to produce therefrom a combined beam by superposition, and radiation detecting means receiving said combined beam and producing a first output signal indicating absorption caused by said substance;
the laser radiation source being tunable to produce electromagnetic radiation the wavelength of which is variable within a predetermined range of wavelengths and being provided with means for causing said wavelength to be swept repetitively through a range of wavelength values;
means for precisely equalizing the optical paths respectively covered by said sample and reference beams from the beam splitter to the beam combining means, said equalizing means including adjusting means for equalizing said paths in a standard condition, such as absence of a substance to be measured, and means automatically responsive to said radiation detecting means for maintaining such equalization in the presence of a substance to be measured even under wavelength variation of said radiation, said automatic equalization maintaining means being equipped to supply a second output signal indicating the phase shift caused by said substance;
means for deriving, from said first output signal, a third output signal representative of the ratio of said first output signal to the intensity of said reference beam, and
means synchronized with said wavelength sweep means for displaying the dependence of said second and third output signals on the wavelength.

12. The apparatus according to claim 11, characterized by a device being situated in the path of one of the reference and sample beams, by means of which the optical path length of the channel traversed by the pertaining beam may be changed, and by said detector being connected to a control arrangement which is joined to an adjusting device coupled with the device for changing the optical path and so acts upon this device that at the position of the device sensing the united beams an intensity maximum due to constructive interference is maintained.

13. The apparatus according to claim 12, characterized by a device for displaying a signal which is proportional to the adjusting signal.

14. Instrument according to one of the claims 11, characterized by a device for displaying the amplitude of the output signal of said detector sensing the united beams.

15. Instrument according to claim 14, characterized by a circuit arrangement being coupled to the output side of said detector sensing the united beams and to the output side of a device sensing a further reference beam, said circuit arrangement passing an output signal corresponding to the ratio of the two signals to an amplitude display- or recording device.

* * * * *

UNITED STATES PATENT OFFICE
CERTIFICATE OF CORRECTION

Patent No. 3825347            Dated July 23, 1974

Inventor(s) Nils KAISER

It is certified that error appears in the above-identified patent and that said Letters Patent are hereby corrected as shown below:

The word "Instrument" appearing as the first word in claims 6, 14 and 15 is changed to -- Apparatus --.

Signed and sealed this 26th day of November 1974.

(SEAL)
Attest:

McCOY M. GIBSON JR.          C. MARSHALL DANN
Attesting Officer             Commissioner of Patents